Feb. 25, 1930.  C. USCHMANN  1,748,591
MOLD ENGRAVING MACHINE
Filed Aug. 5, 1925  2 Sheets-Sheet 1

INVENTOR.
CURT USCHMANN
BY
ATTORNEY.

Feb. 25, 1930.     C. USCHMANN     1,748,591
MOLD ENGRAVING MACHINE
Filed Aug. 5, 1925     2 Sheets-Sheet 2
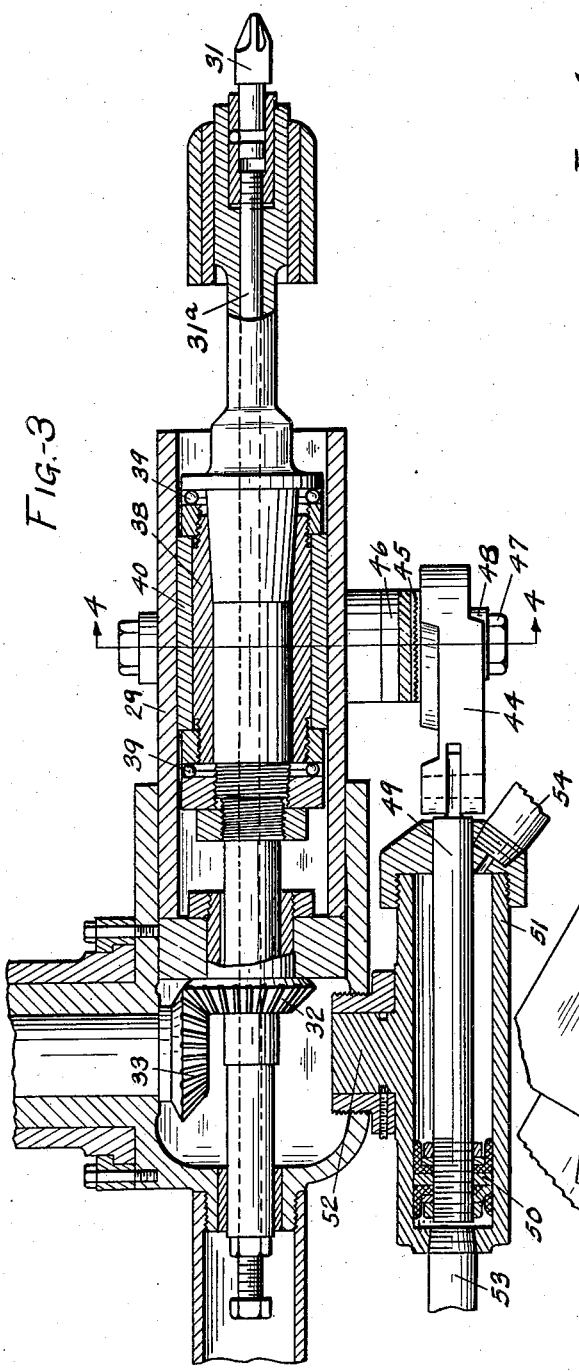
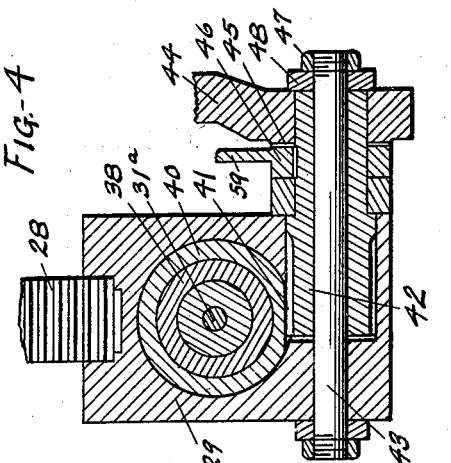
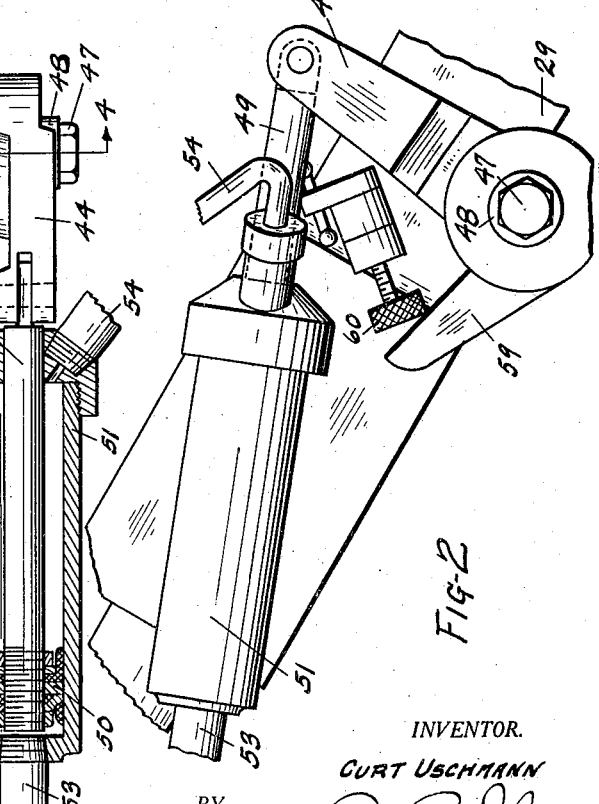
INVENTOR.
CURT USCHMANN
BY
ATTORNEY Patented Feb. 25, 1930

1,748,591

UNITED STATES PATENT OFFICE

CURT USCHMANN, OF AKRON, OHIO, ASSIGNOR TO THE FIRESTONE TIRE AND RUBBER COMPANY, OF AKRON, OHIO, A CORPORATION OF OHIO

MOLD-ENGRAVING MACHINE

Application filed August 5, 1925. Serial No. 48,268.

This invention relates to mold engraving machines such as are used for cutting tread designs in annular tire molds.

The chief object of the invention is to provide means for operating the tool of said machines toward or from the work, the means to be controllable by the operator at a point conveniently near the work-controlling and tool-controlling instrumentalities customarily employed in engraving machines by which the tool is made to copy a design or pattern in a pattern plate or template, whereby the machine is more conveniently and easily operated with a minimum of effort and at greatly lowered cost.

The foregoing and other objects are obtained by the construction illustrated in the accompanying drawing and described below. It is to be understood that the invention is not limited to the specific embodiment thereof which is shown and described.

Of the accompanying drawings:

Figure 2 is an enlarged side elevation of the tool-operating mechanism embodying the invention;

Figure 3 is a plan view thereof partly in section; and

Figure 4 is a section on line 4—4 of Figure 3.

Figure 1:
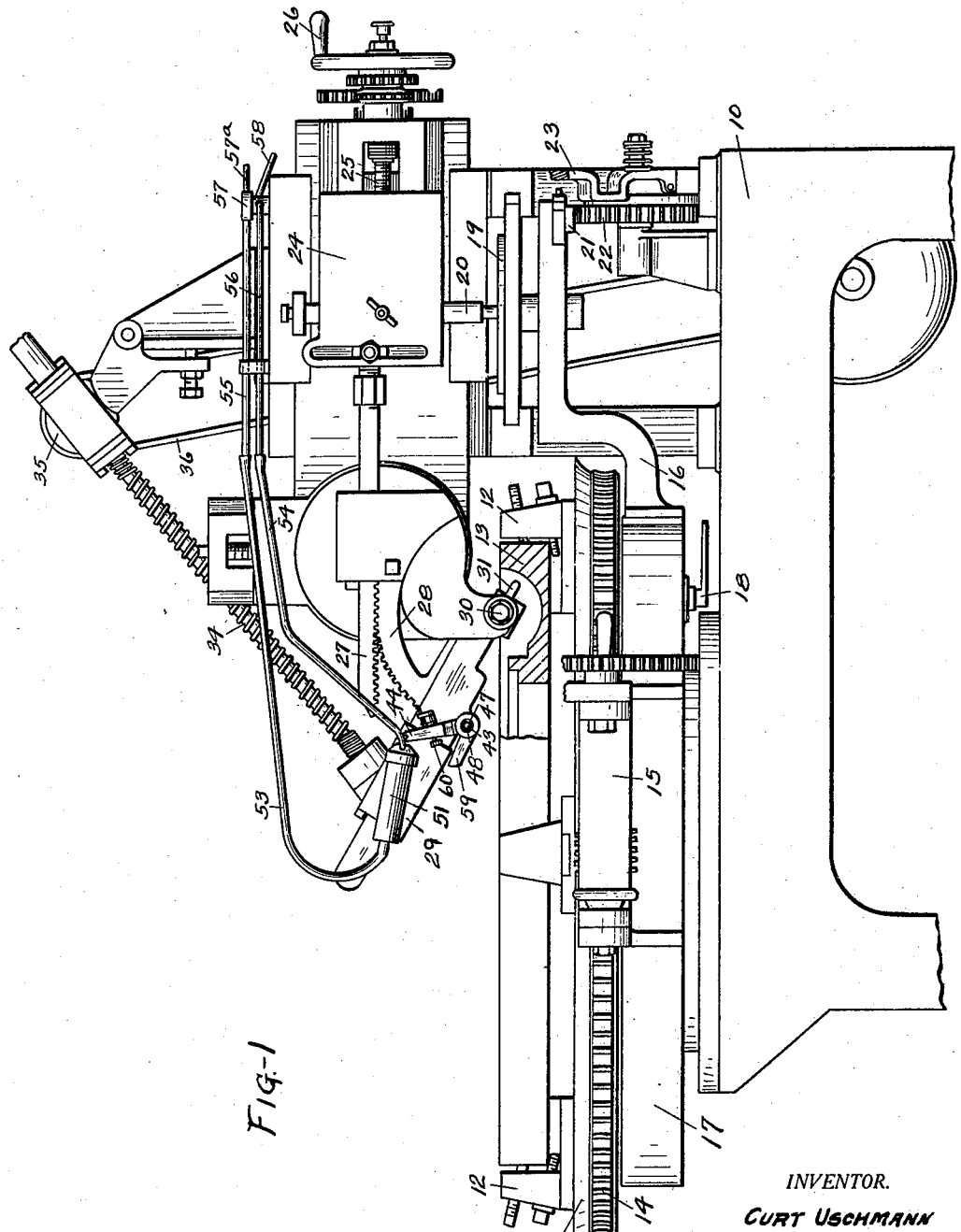
Figure 1 is a side elevation of a device embodying the invention.

Referring to the drawings, 10 is a suitable supporting table having rotatably mounted thereon a turret 11 provided with chuck members 12, 12 so as removably to receive and secure in place a tire mold section 13. Turret 11 has a ring gear 14 thereon by which it is adapted to be indexed by a suitable means illustrated generally at 15 and also adapted to be rotated through limited angles by an arm 16 provided on a member 17 journaled on table 10 for concentric rotation with turret 11 and adapted to be releasably connected thereto by any suitable device illustrated generally at 18.

Arm 16 carries a pattern plate 19 having cut therein the design to be engraved in mold section 13 and in which design engages a table and tool controlling pin or follower 20. To move table 11 to effect circumferential cuts in the mold, arm 16 has thereon a rack 21 with which is meshed a gear 22 adapted to be rotated by a hand lever 23.

Pin 20 is secured to a slide 24 operable by a screw 25 by means of a hand wheel 26 and adapted to reciprocate a rack 27 engaged with a sector gear 28 for angularly swinging a tool head 29 pivoted at 30 and having a rotary cutting tool 31 therein. Tool 31 is adapted to be rotated by a shaft $31^a$ keyed or splined so as to be shiftable through a bevel gear 32 meshed with a bevel gear 33 driven by means of a floating shaft 34 adapted to be rotated in any position by means of a pulley 35 driven by a belt 36 driven by a motor 37.

The machine as briefly outlined above is a known type of mold engraving machine and accordingly a detailed description thereof is unnecessary. The means for operating tool 31 in head 29 toward and from mold section 13 and by which the desired object of the invention is obtained will now be described.

Arranged in head 29 is a sleeve 38 carrying thrust bearings 39, 39 and in which tool-driving shaft $31^a$ is journaled and adapted to be shifted by the construction illustrated in Figure 3 and which has heretofore been employed in engraving machines. Sleeve 38 is arranged to be shifted in head 29 by means of a second sleeve 40 encircling the same and connected thereto, sleeve 40 being formed with rack teeth at 41 with which is meshed a pinion 42 journaled on a pin 43.

It is desirable for the reason to be explained to provide means for operating pinion 42 from a remote point. Accordingly, on sleeve $42^a$ of pinion 42 is arranged a lever 44 having a clutch element 45 thereon arranged to clutch an element 46 fixed on sleeve $42^a$, members 45 and 46 being held in engagement by means of a nut 47 and washer 48 whereby the relative position of lever 44 on sleeve $42^a$ may be readily varied.

Lever 44 has connected thereto a piston rod 49 having thereon a piston 50 operable in a double-acting cylinder 51 swiveled at 52 on head 29. Connected with opposite ends of cylinder 51 are flexible conductors 53 and 54 connected respectively to air-supply pipes 55 and 56 to which the admission or release of air under pressure is controlled by a suitable valve 57 operable by means of a lever 57$^a$ for controlling an air inlet 58. Valve 57, as it will be seen, is mounted on the machine adjacent hand-wheel 26 and lever 23 so as to be readily operable by a machine operative at his normal working station.

In order to accurately determine the desired depth of cut, member 46 has fixed thereon an arm 59 arranged to engage an adjustable stop 60 provided with a suitable micrometer adjusting means of any known type, such construction having heretofore been employed for the purpose described.

It will appear from the foregoing that during the design cutting operations, in order to operate the tool into or away from the work, the operative need not move from his station. By operating valve 57, the tool can be moved either toward or from the work in any position of head 29.

Modifications of the invention may be resorted to without departing from the spirit thereof or the scope of the appended claims.

What is claimed is:

1. In a mold engraving machine, in combination, a work-operating means, a tool-operating means, a pattern for controlling both of said means, said means being arranged to be simultaneously manually operated by a single operative to copy said pattern in said work, and means for moving the tool toward or from the work along its own axis, said means being adapted to be controlled from adjacent the normal station of said operative at said machine assumed when operating said work and tool.

2. In a mold engraving machine, a mold supporting turret, a tool movable radially of the turret and also toward and from the same along its own axis, a pattern plate connected to the turret, a pattern plate follower connected to the tool, means for rotating the turret to effect relatively circumferential movement of the pattern plate to the follower, means adjacent the first means for moving the tool and effecting relatively radial movement of the follower to the pattern plate, and means adjacent the first and second means for moving the tool toward or from the work along its own axis whereby all of said means are controllable by an operative at a single station.

CURT USCHMANN.